United States Patent
Tonooka

(10) Patent No.: US 6,677,940 B1
(45) Date of Patent: Jan. 13, 2004

(54) DESIGN SUPPORT SYSTEM

(75) Inventor: Mitsuhiro Tonooka, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 382 days.

(21) Appl. No.: 09/675,050

(22) Filed: Sep. 29, 2000

(30) Foreign Application Priority Data

Jan. 27, 2000 (JP) ....................................... 2000-018829

(51) Int. Cl.[7] ............................................... G06T 15/00
(52) U.S. Cl. ....................................... 345/419; 345/853
(58) Field of Search ................................. 345/418, 419, 345/619, 420, 441, 853

(56) References Cited

U.S. PATENT DOCUMENTS 5,485,560 A * 1/1996 Ishida et al. ................. 345/619
5,742,288 A * 4/1998 Nishizaka et al. .......... 345/418

* cited by examiner

Primary Examiner—Mark Zimmerman
Assistant Examiner—Huedung X. Cao
(74) Attorney, Agent, or Firm—Staas & Halsey LLP

(57) ABSTRACT

There is provided a design support system which supports work for designing a two-dimensional or three-dimensional shape by combining a plurality of parts and assembly data showing the arrangement relationship between the parts, and by which a desirable assembly data can be found easily. Shape display output unit displays the two-dimensional or three-dimensional shape stored in a database on a display unit. Part specification unit specifies a predetermined part displayed on the display unit. Assembly data acquisition unit acquires assembly data relating to the specified part from the database. Assembly data display output unit rearranges the acquired assembly data according to the hierarchical structure and displays the rearranged assembly data on the display unit. Level number specification unit makes a part of hierarchical structure displayed by the assembly data display output unit in a non-display state.

15 Claims, 15 Drawing Sheets

| NUMBER OF MODELS UNDER ASSEMBLY DATA | | |
|---|---|---|
| MODEL NAME | POSITION | POINTER |
| MODEL NAME | POSITION | POINTER |
| ⋮ | ⋮ | ⋮ |
| MODEL NAME | POSITION | POINTER |

FIG. 11

DESIGN SUPPORT SYSTEM

BACKGROUND OF THE INVENTION (1) Field of the Invention

The present invention relates to a design support system and, more particularly, to a design support system for supporting work for designing a two-dimensional or three-dimensional shape by combining assembly data showing a connection relationship of a plurality of parts.

(2) Description of the Related Art

In a design support system such as CAD (Computer Aided Design), an arbitrary two-dimensional or three-dimensional dimensional shape is generated by combining part data having an actual shape (figure, size, etc.) with assembly data showing the arrangement conditions (position, direction, etc.) of part data.

The part data and the assembly data often have a hierarchical structure. An example thereof will be described with reference to FIGS. 12 to 14.

For example, a three-dimensional model having a completed shape as shown in FIG. 13 is considered, the model consisting of a cone P1, a circular cylinder P2 having a recess at the lower part thereof, and a circular cylinder P3 having a protrusion at the upper part thereof as shown in FIG. 12.

Such a model is configured by data having a hierarchical structure as shown in FIG. 14. Specifically, this model is formed of part data corresponding to the cone P1, the circular cylinder P2, and the circular cylinder P3, which are actual data, assembly data (hereinafter referred simply to as an assembly) A2 showing the arrangement relationship etc. between the circular cylinder P2 and the circular cylinder P3, and an assembly A1 showing the arrangement relationship between the circular cylinders P2 and P3 and the cone P1.

On a screen (hereinafter referred to as a view screen) displaying an actual view of a model (for example, a model as shown in FIG. 13) having a two-dimensional or three-dimensional shape, assembly data are not usually displayed. Conventionally, therefore, when assembly data are edited, a tree as shown in FIG. 15, for example, has been displayed separately from the view screen, and desirable assembly data have been specified on this tree.

With such a method, however, for example, when it is desired to edit assembly data corresponding to a predetermined part displayed on a view screen, it is necessary to find that part on a tree. For this purpose, the part name must be remembered exactly. Therefore, there arises a problem of an increased burden on the operator.

Thereupon, there has been proposed a method in which when a predetermined part is specified on a view screen with a mouse pointer etc., the corresponding item is highlighted on the tree. However, this method has a problem in that the operation is complicated because the item to be highlighted must be set in a state of being displayed in advance on the tree. To solve this problem, there has been proposed a method in which when a part having not been displayed on the tree is specified, the display mode of the tree is automatically changed so that the specified item is displayed. However, this method also has a problem in that the operator is confused because the display mode of the tree changes successively according to the specified part.

Also, there has been proposed a method in which when a predetermined part is specified on a view screen with a mouse pointer, etc., the corresponding item is highlighted on the tree, and also buttons for the movement to the high or low order of the specified part are provided to facilitate the movement between hierarchical levels. However, such a method also has a problem in that a complicated display makes easy finding of desirable assembly data difficult.

SUMMARY OF THE INVENTION

The present invention has been made in view of such a situation, and accordingly an object thereof is to provide a design support system by which desirable assembly data can be found easily.

To achieve the above object, the present invention provides a design support system which supports work for designing a two-dimensional or three-dimensional shape by combining a plurality of parts and assembly data showing the arrangement relationship between the parts. This design support system includes shape display output means for displaying the two-dimensional or three-dimensional shape; part specification means for specifying a predetermined part constituting the two-dimensional or three-dimensional shape displayed by the shape display output means; assembly data acquisition means for acquiring assembly data relating to the part specified by the part specification means; and assembly data display output means for rearranging the assembly data acquired by the assembly data acquisition means according to the hierarchical structure and displaying the rearranged assembly data.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 is a chart showing a data structure for assembly data;

DESCRIPTION OF THE PREFERRED EMBODIMENTS

An embodiment of the present invention will be described with reference to the accompanying drawings.

Figure 1:
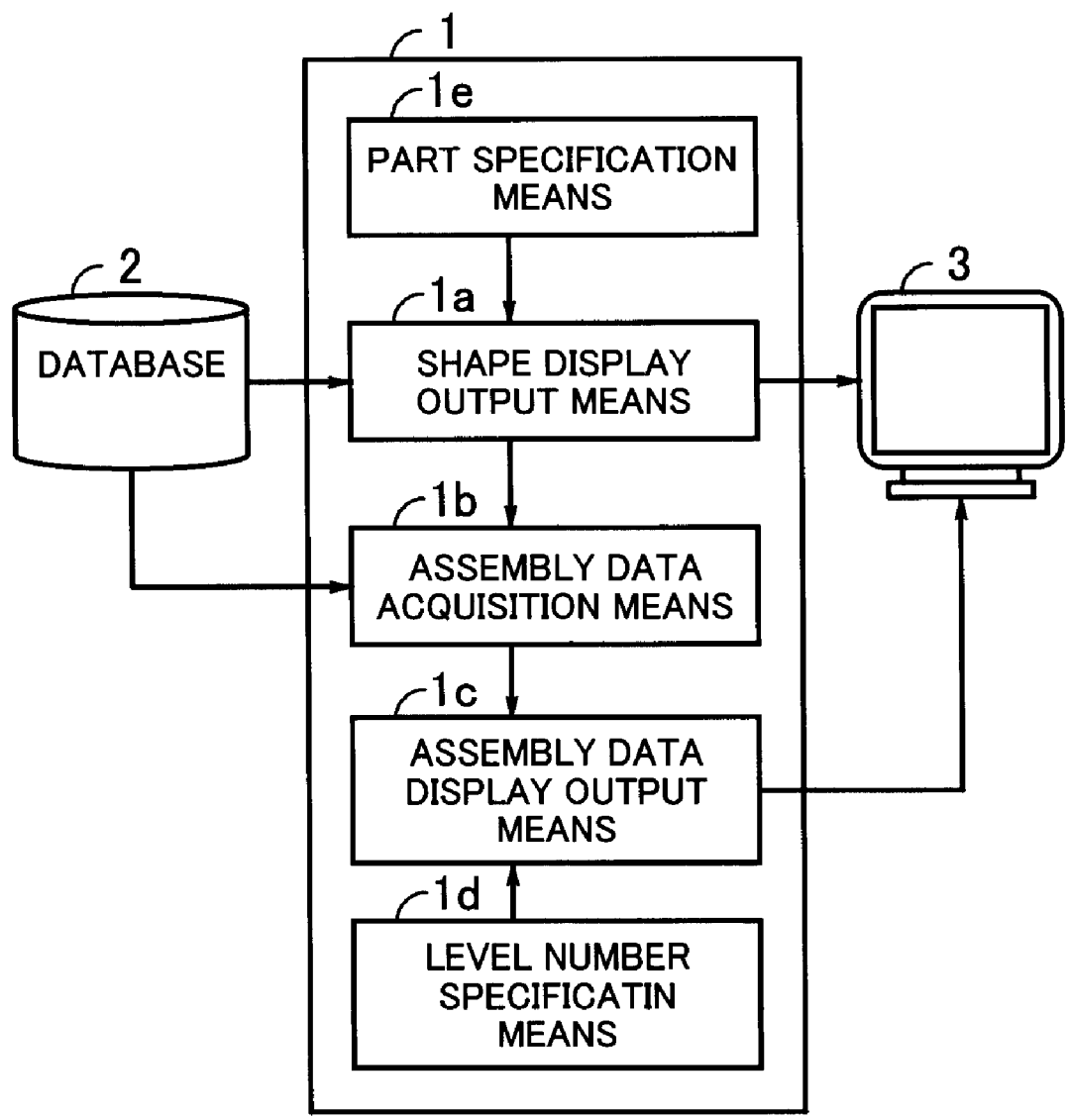
FIG. 1 is a principle diagram for illustrating the operation principle of the present invention.

FIG. 1 is a principle diagram for illustrating the operation principle of the present invention. In FIG. 1, a design support system 1 includes shape display output means 1a, assembly data acquisition means 1b, assembly data display output means 1c, level number specification means 1d, and part specification means 1e. With this system 1, model data stored in a database 2 is displayed on a display unit 3, and when a predetermined part displayed on the, display unit 3 is specified, the related assembly data is retrieved and displayed on the display unit 3.

The shape display output means 1a displays a predetermined model having a two-dimensional or three-dimensional shape, which is stored in the database 2, on the display unit 3.

The part specification means 1e specifies a predetermined part constituting the two-dimensional or three-dimensional shape displayed on the display unit 3 by the shape display output means 1a.

The assembly data acquisition means 1b acquires assembly data relating to the part specified by the part specification means 1e from the database 2.

The assembly data display output means 1c rearranges the assembly data acquired by the assembly data acquisition means 1b according to the hierarchical structure thereof and displays the rearranged assembly data on the display unit 3.

The level number specification means 1d specifies the number of levels to be displayed.

The database 2 stores a model or the like consisting of part data showing a two-dimensional or three-dimensional shape and assembly data showing an arrangement relationship etc. of the part data.

The display unit 3, which is formed of a CRT (Cathode Ray Tube) monitor, for example, displays a model or the like generated by the design support system 1.

Next, the operation of the above-described design support system 1 shown in the principle view will be explained.

Figure 2:
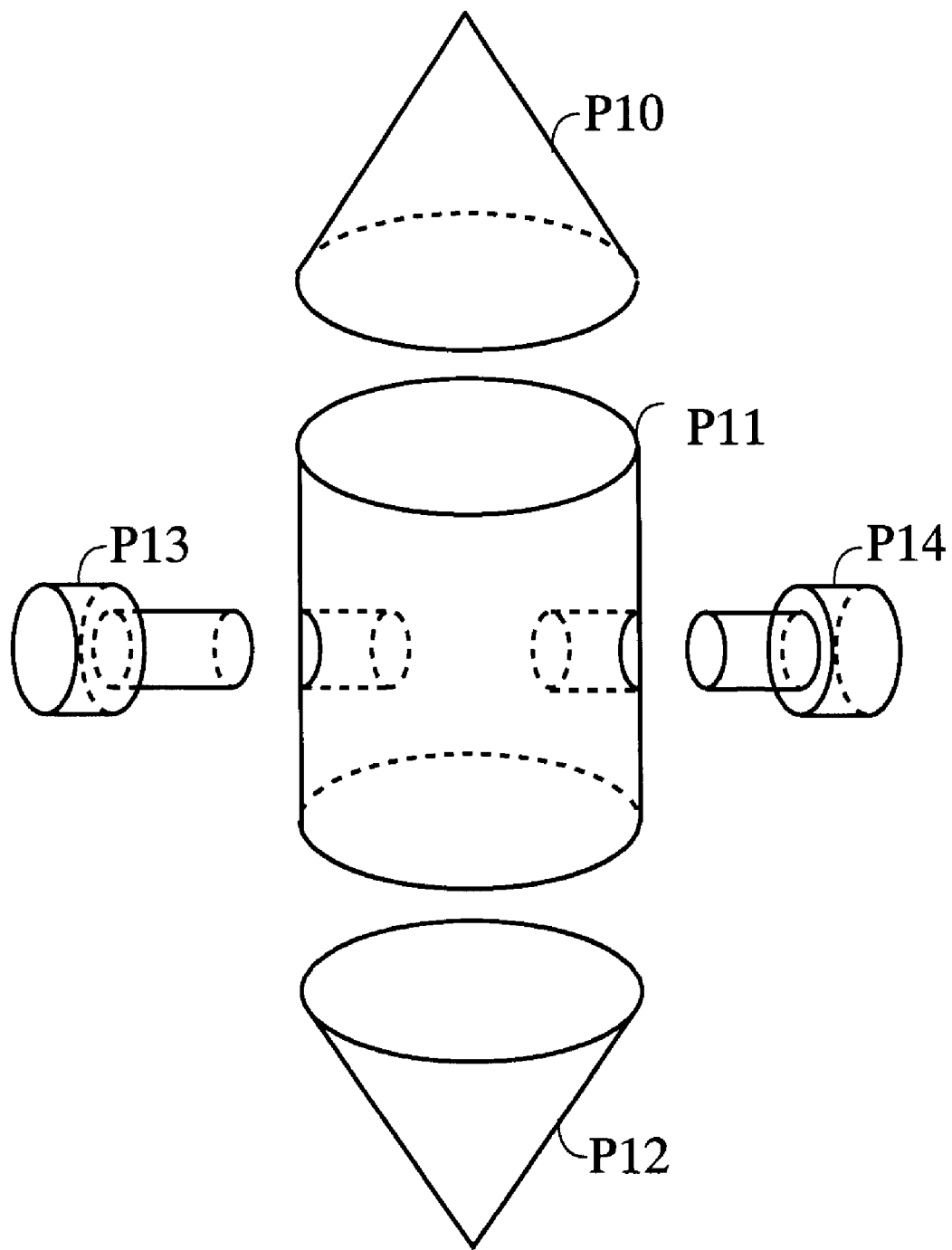
FIG. 2 is a view showing one example of a model to be processed on the operation principle shown in FIG. 1.
Figure 3:
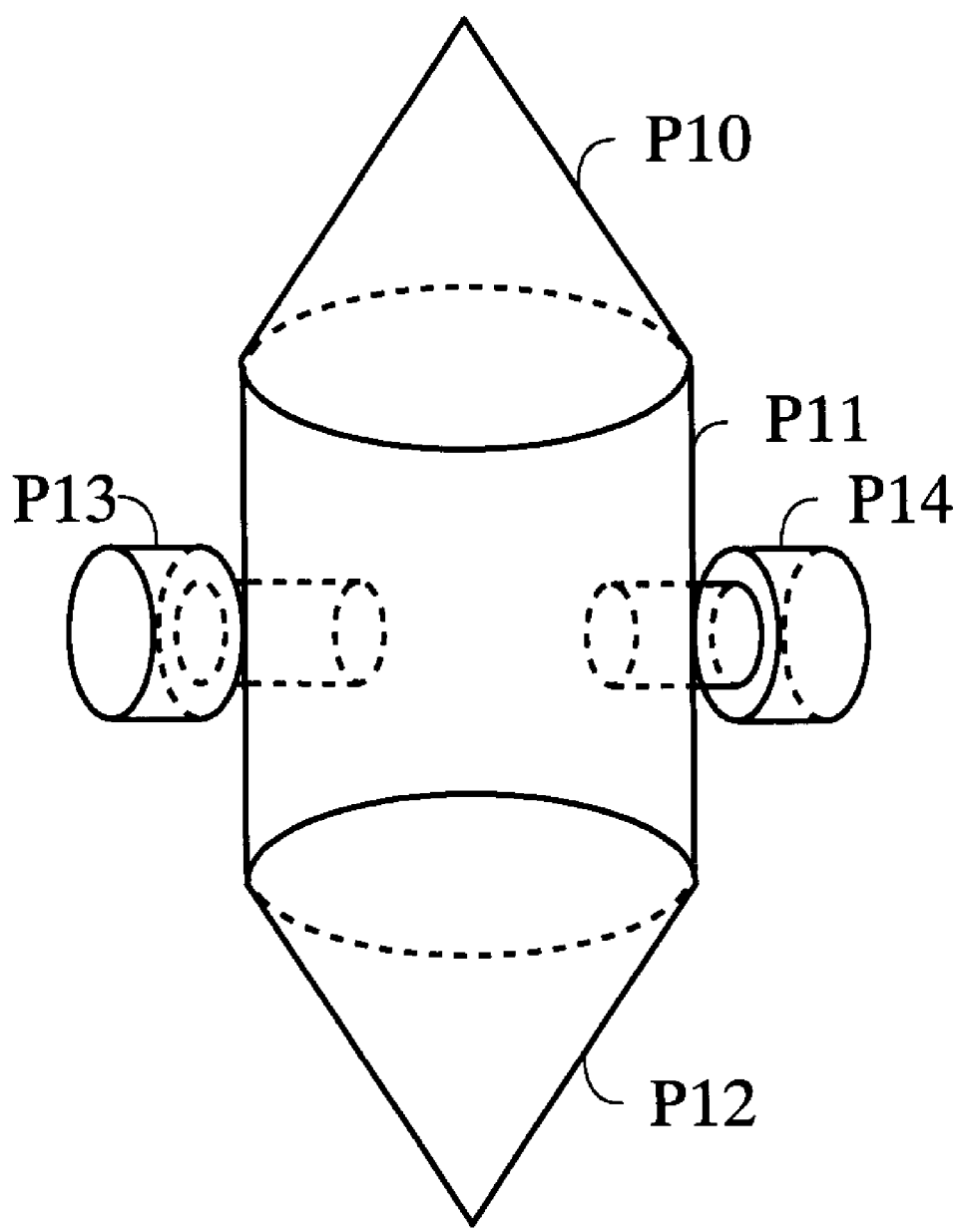
FIG. 3 is a completed construction view of the model shown in FIG. 2.

It is now assumed that a model that is composed of five parts P10 to P14 as shown in FIG. 2, and a model having a completed construction shown in FIG. 3 is stored in the database 2. In this model, the parts P10 and P12 having a conical shape are arranged over and under the part P11 having a cylindrical shape, and the parts P13 and P14 having a protrusion are engaged with recesses provided on the side face of the part P11.

Figure 4:
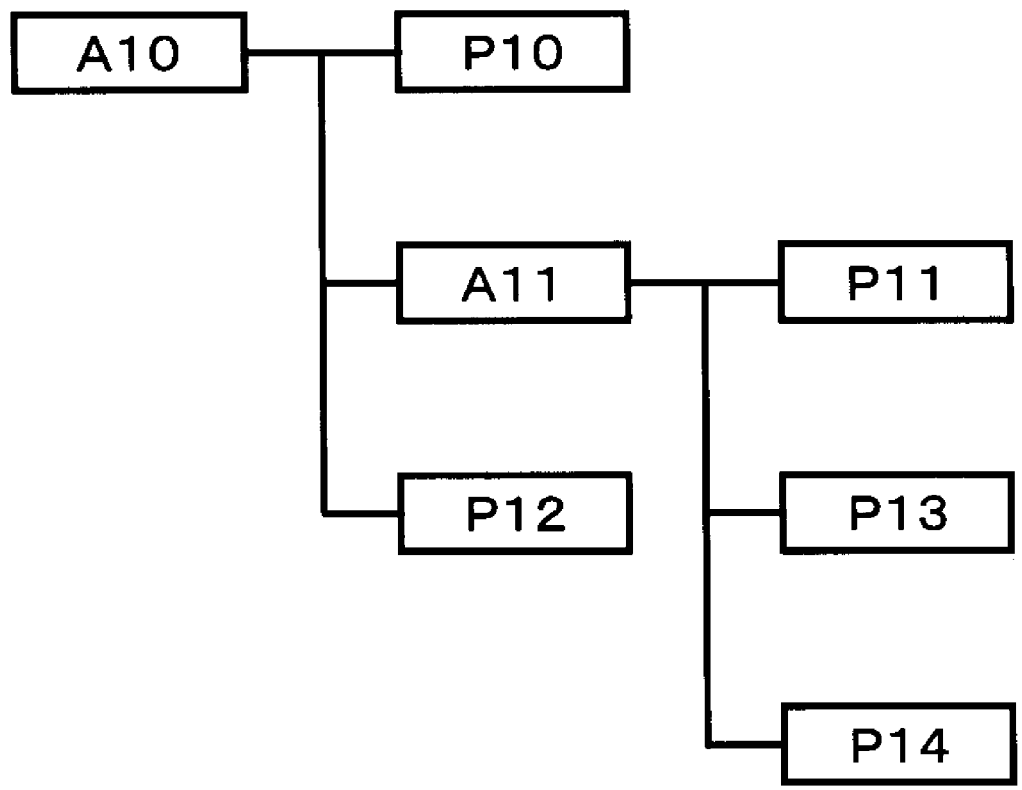
FIG. 4 is a diagram showing one example of a hierarchical structure of data constituting the model shown in FIG. 3.

FIG. 4 is a diagram showing one example of a hierarchical structure of part data and assembly data constituting the model shown in FIG. 3. As shown in FIG. 4, the arrangement relationship etc. of the parts P11, P13 and P14 are controlled by assembly data A11. Also, the arrangement relationship etc. of the parts P10 and P12 and the part group under the assembly data A11 are controlled by assembly data A10.

When such a model is to be processed, the shape display output means 1a outputs a screen (view screen) for displaying an image as shown in FIG. 3 on the display unit 3. When the operator specifies a part relating to desirable assembly data with reference to the view screen by using the part specification means 1e to edit the assembly data, the part specification means 1e informs the assembly data acquisition means 1b on the specified part via the shape display output means 1a.

The assembly acquisition means 1b acquires assembly data belonging to a level higher than the part specified by the part specification means 1e. For example, when the part P14 is specified, the assembly data A11 belonging to the next higher level and the assembly data A10 lying at the root.

The assembly data display output means 1c rearranges the, assembly data acquired by the assembly data acquisition means 1b according to the hierarchical structure and displays the rearranged assembly data on the display unit 3.

For example, when the part P14 is specified, the assembly data A10 and A11 are acquired as described above, and the tree shown in FIG. 5(A) is displayed on the display unit 3.

Figure 5A:
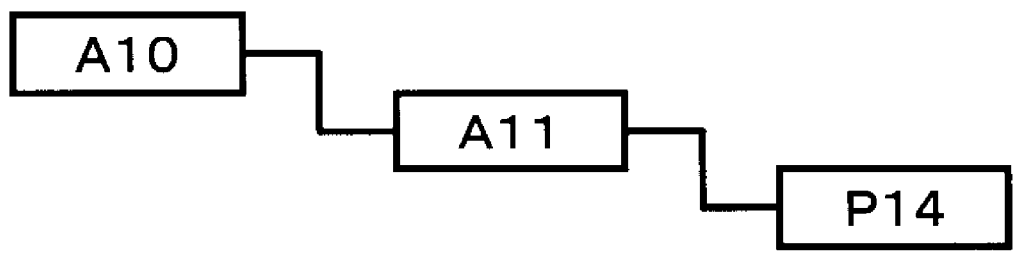
FIG. 5(A) is a diagram showing a processing result when a part P14 shown in FIG. 4 is specified.
Figure 5B:
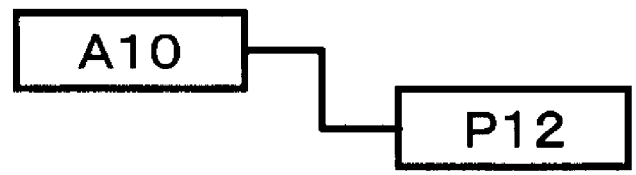
FIG. 5(B) is a diagram showing a processing result when a part P12 shown in FIG. 4 is specified.

Also, when the part P12 is specified, the assembly data A10 belonging to the next higher level is acquired, and the tree shown in FIG. 5(B) is displayed on the display unit 3.

The level number specification means 1d is operated by the operator when the number of levels of the tree displayed on the display unit 3 is specified. For example, when the part P14 is specified, the tree shown in FIG. 5(A) is usually displayed on the display unit 3. When "2" is set as the number of levels by using the level number specification means 1d, however, only the part P14 and the assembly data A11 next higher than the part P14 are displayed. Therefore, when the number of levels is large, desirable assembly data can be found quickly by defining the displayed number of levels.

As described above, according to the present invention, when a predetermined part is specified on the view screen, the assembly data belonging to the levels higher than that part are retrieved, and the obtained assembly data are rearranged according the hierarchical structure and is displayed, so that the desirable assembly data can easily be found. Alternatively, the assembly data belonging to the lower levels, not the higher levels, may be displayed.

Also, since the displayed number of levels of the tree can be specified, even if the number of levels is large, desirable assembly data can be found quickly.

The following a description of the embodiment of the present invention.

Figure 6:
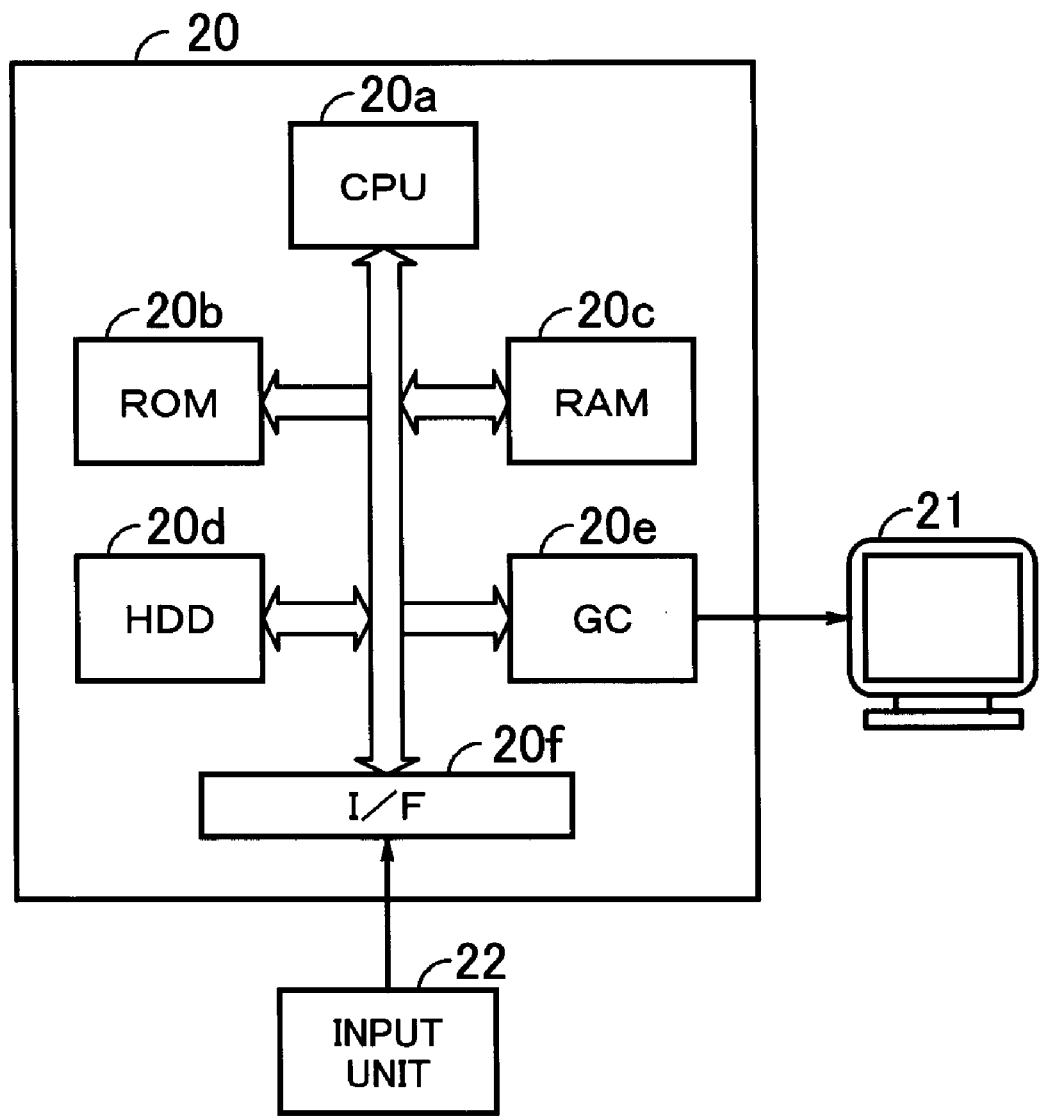
FIG. 6 is a block diagram showing typical configuration of an embodiment of the present invention.

FIG. 6 is a block diagram showing typical configuration of the embodiment of the present invention. As shown in FIG. 6, a design support system 20, which includes a CPU (Central Processing Unit) 20a, ROM (Read Only Memory) 20b, RAM (Random Access Memory) 20c, HDD (Hard Disk Drive) 20d, GC (Graphic Card) 20e, and I/F (Interface) 20f, executes processing according to the information sent from an input unit 22, and displays the processing result on a display unit 21.

The CPU 20a executes various arithmetic operations according to a program stored in the HDD 20d etc., and controls the parts of the system.

The ROM 20b stores basic programs, data, and the like executed by the CPU 20a.

The RAM 20c temporarily stores the program being executed by the CPU 20a and the data being processed.

The HDD 20d stores the program to be executed by the CPU 20a, the generated model data, and the like.

The GC 20e executes a drawing operation according to a drawing command supplied from the CPU 20a, and converts the obtained image into an image signal and outputs the signal onto the display unit 21.

The I/F 20f converts the data sent from the input unit 22 so that it matches an expression format within the design support system 20.

The display unit 21, which consists of, for example, a CRT monitor or a liquid crystal display, displays the image signal sent from the GC 20e.

The input unit 22, which consists of a mouse and/or a keyboard, is operated when the operator inputs information.

The following is a description of the operation of the design support system 20 of the above-described embodiment.

Figure 7:
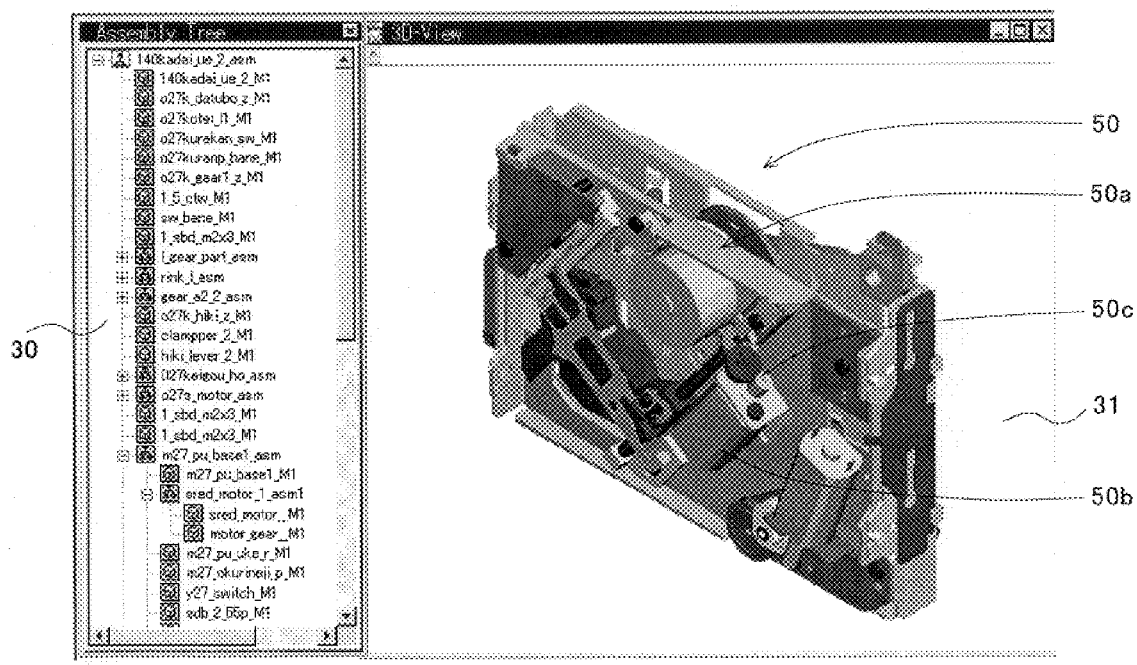
FIG. 7 is a view showing a display example of a screen displayed in the embodiment shown in FIG. 6.

Let it be assumed that a CD (Compact Disk (trade name)) changer is selected as an model to be handled, and a screen as shown in FIG. 7 is displayed on the display unit 21. In this display example, a window 30 titled "Assembly Tree" and a window 31 titled "3D-View" are displayed. In the window 31, the shape of the CD changer 50 is displayed in a three-dimensional shape. Also, in the window 30, a tree composed of part data forming the CD changer 50 and assembly data is displayed.

In such a state, if the input unit 22 is operated, and a gear 50c engaged with the rotation shaft of a thread motor 50b of the CD changer 50 displayed in the window 31 is specified by a mouse pointer, the CPU 20a detects that the gear 50c is specified.

The CPU 20a acquires assembly data belonging to a level higher than the specified part with reference to the part data and assembly data stored in the HDD 20d.

In this example, since the specified gear 50c corresponds to "motor_gear_M1" (the displayed item in the fifth line from the bottom) shown in the window 30, "sred_motor_1_asm1", "m27_pu_base1_asm", and "140kadai_ue_2_asm" are acquired as the assembly data belong to the levels higher than the gear 50c. The assembly data "sred_motor_1_asm1" is data showing the arrangement relationship between the thread motor 50b and the gear 50c, and "m27_pu_base1_asm" is assembly data relating to a chassis 50a on which the thread motor 50b is mounted. Further, "140kadai_ue_2_asm" is assembly data relating to the whole of the CD changer.

Figure 8:
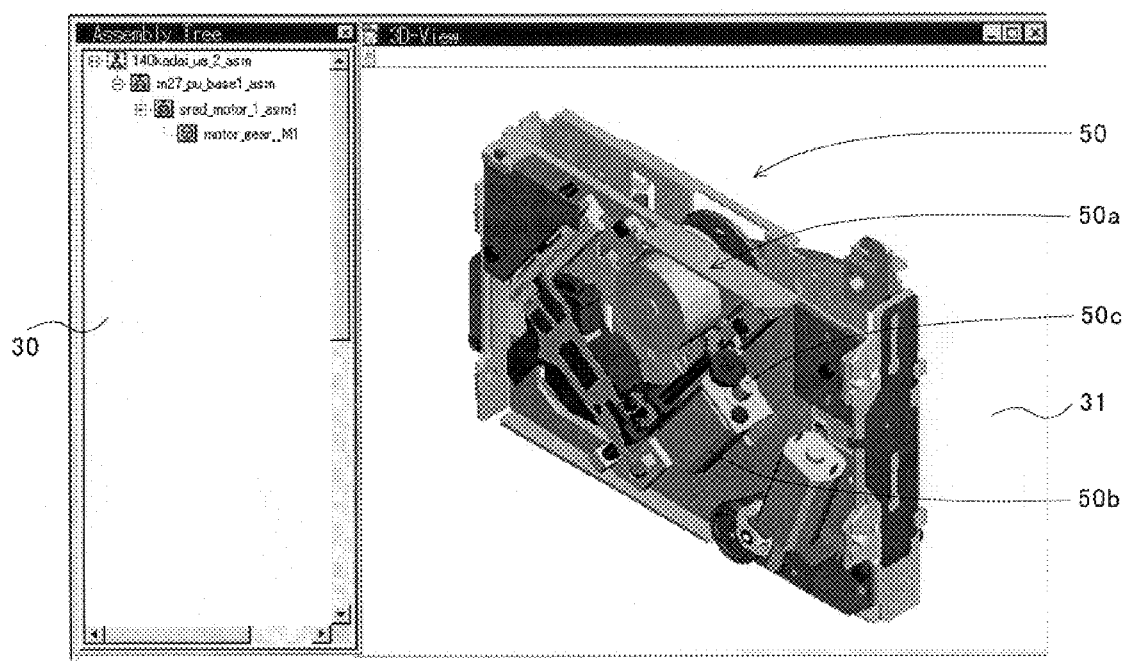
FIG. 8 is a view showing a display example of a screen displayed in a case where a gear is specified in the typical display shown in FIG. 7.

Next, the CPU 20a rearranges the acquired assembly data and specified part data according to the hierarchical structure and displays them in the window 30. As a result, the screen as shown in FIG. 8 is displayed on the display unit 21. In this example, a tree in which the part data "motor_gear_M1" corresponding to the specified part is located at the lowest level, and "sred_motor_1_asm1", "m27_pu_base1_asm", and "140kadai_ue_2_asm" are located at the levels higher than "motor_gear_M1" is displayed.

According to this tree, all assembly data lying at the levels ranging from the specified part to the root can be seen at a glance, so that the desirable assembly data can be found easily.

If a right mouse button constituting the input unit 22 is clicked in this state, only the levels corresponding to the number of clicks are displayed in the window 30.

Figure 9:
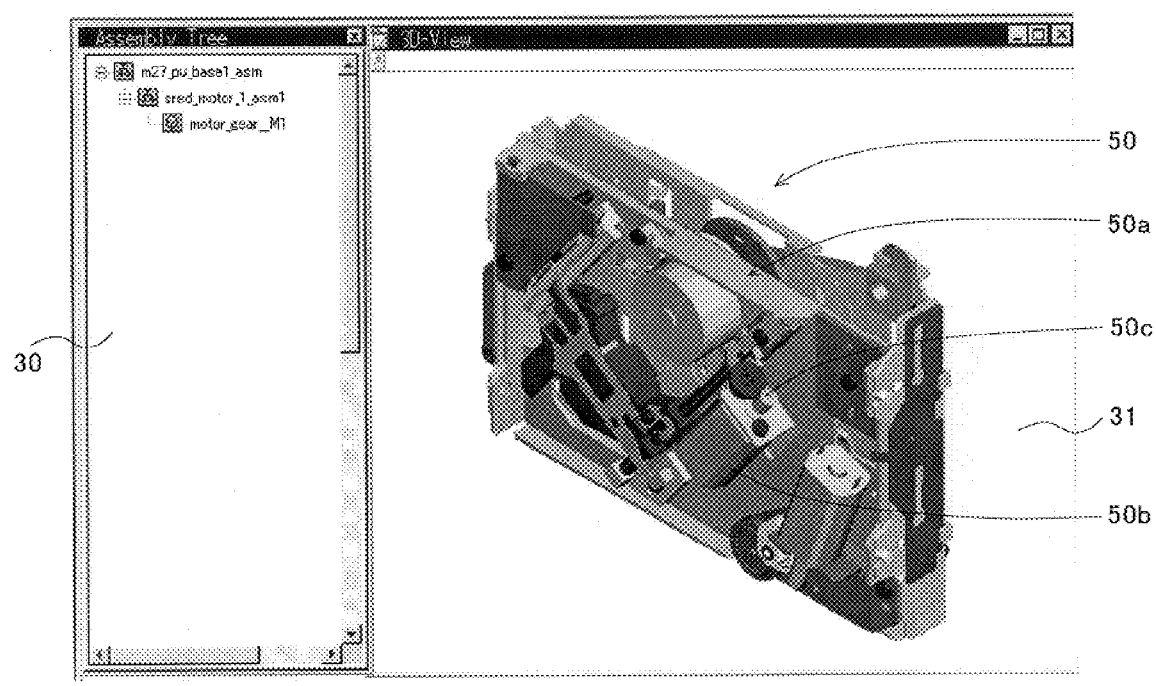
FIG. 9 is a view showing a display example of a screen displayed in a case where a right mouse button is clicked in the display example shown in FIG. 8.

If the right mouse button is clicked one time, for example, the levels of the number obtained by deducting "1" from the number of levels being displayed now in the window 30 are displayed. Specifically, on the screen shown in FIG. 8, if the right button is clicked one time only, the screen shown in FIG. 9 is displayed. In this example, data of three levels from the specified part data "motor_gear_M1" are displayed.

If the right button is clicked repeatedly, the number of levels displayed decreases, and a state in which only the specified part is displayed in the window 30 is established. If the right button is clicked further, the display state restores to the original state (state shown in FIG. 8).

If a left mouse button is clicked, all levels are displayed as shown in FIG. 8.

As described above, according to the present invention, when a desirable part displayed in the window 31 is specified, assembly data belonging to the levels higher than the specified part are acquired and displayed according to the hierarchical structure. Therefore, the desirable assembly data can be found easily.

Also, since the number of levels being displayed is increased or decreased according to the right mouse button click or the like, the objective assembly data can be found quickly even when the number of levels are large.

Although a list of assembly data belonging to the levels higher than the specified part is displayed in the above-described embodiment, a list of assembly data belonging to the lower levels may be displayed. Alternatively, a list of assembly data belonging to both higher and lower than the specified part may be displayed.

Also, although the number of levels displayed is increased or decreased according to the mouse button click in the above-described embodiment, the number of levels to be displayed may be specified by using, for example, a dialog box.

Further, when the number of levels displayed is increased or decreased, a predetermined number of assembly data are displayed with the specified part being the center in the above-described embodiment. However, the predetermined assembly data may be displayed, for example, with the root being the center.

Figure 10:
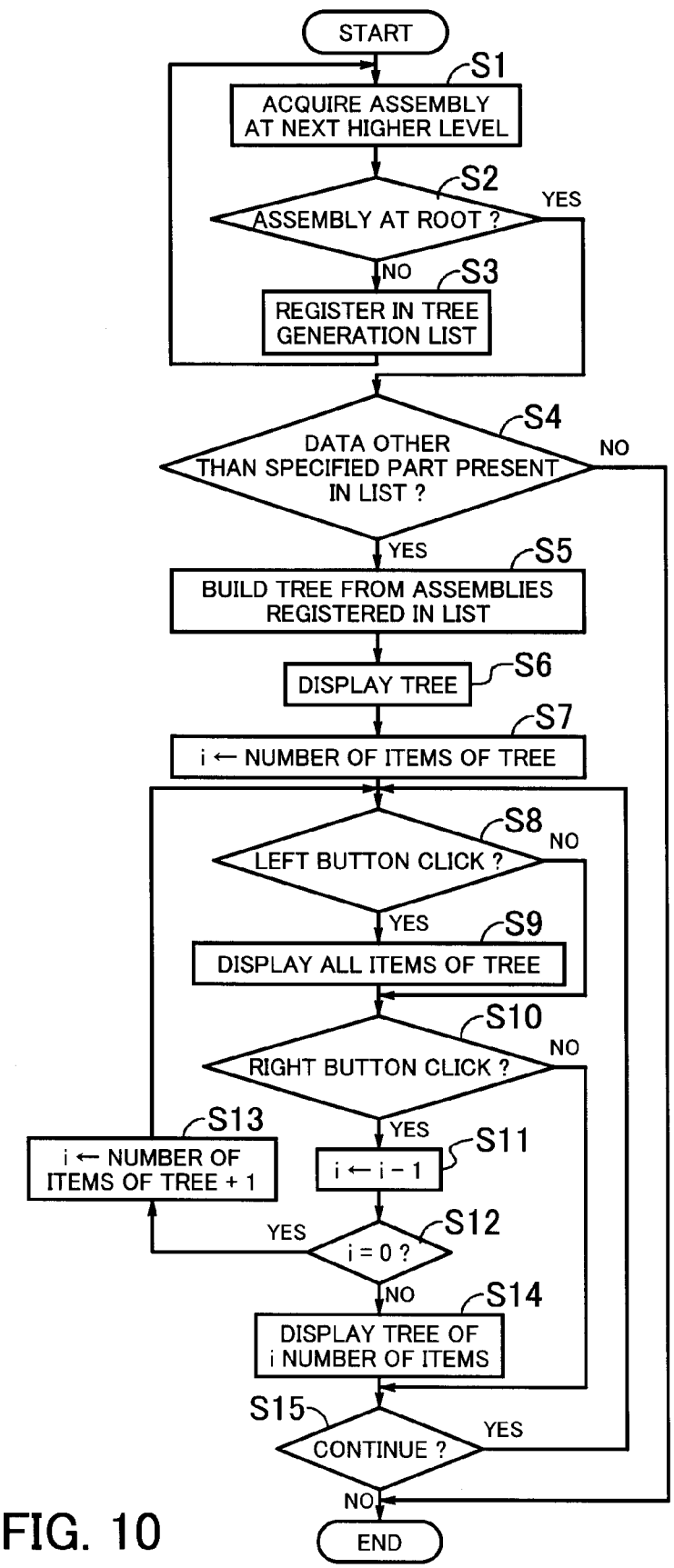
FIG. 10 is a flowchart for illustrating an example of processing executed in the embodiment shown in FIG. 6.
Figure 12:
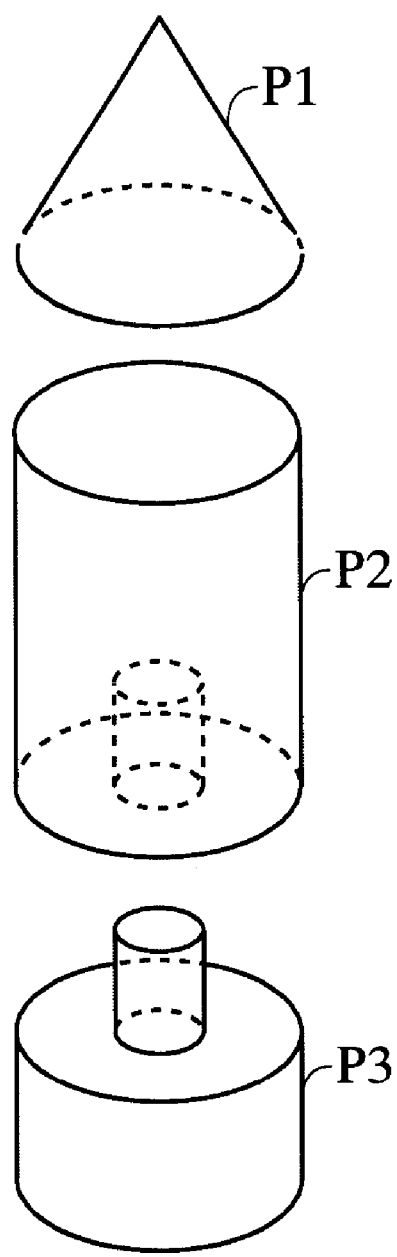
FIG. 12 is a view showing one example of a three-dimensional model.
Figure 13:
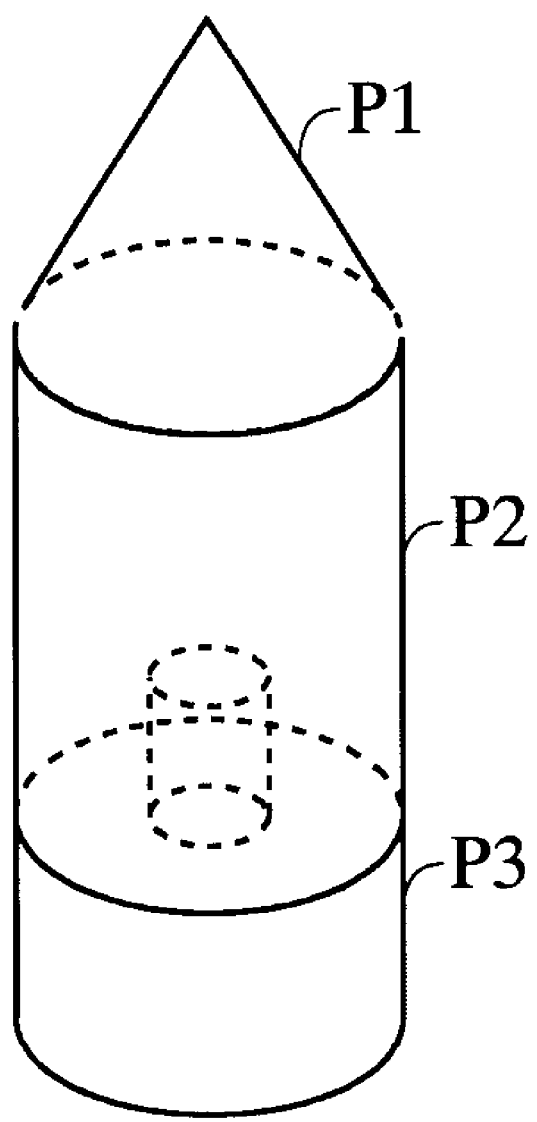
FIG. 13 is a completed construction view of the three-dimensional model shown in FIG. 12.
Figure 14:
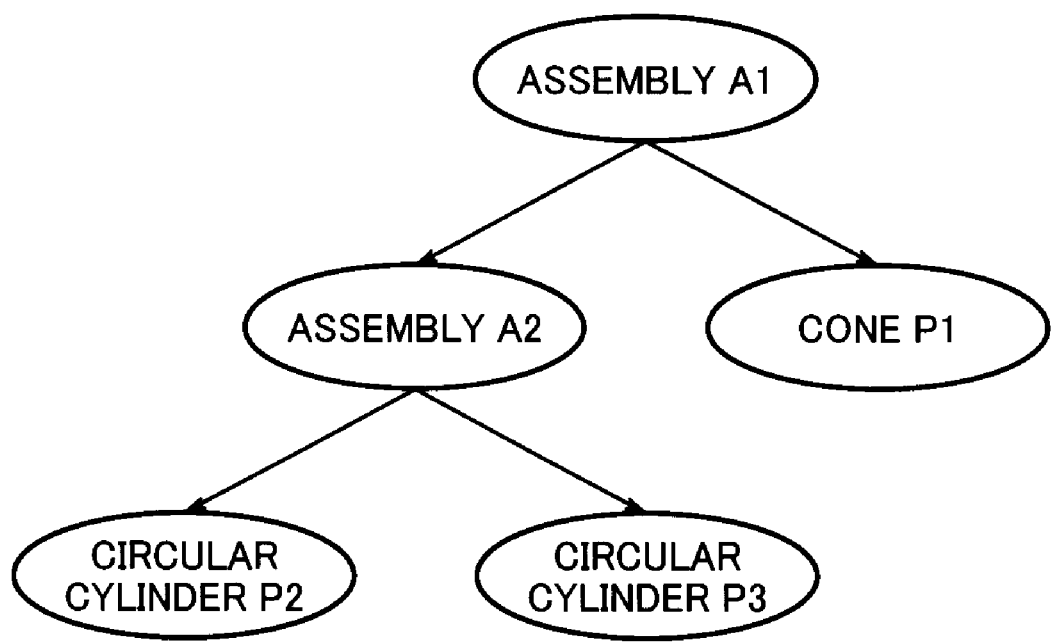
FIG. 14 is a diagram showing one example of data constituting the three-dimensional model shown in FIG. 13.
Figure 15:
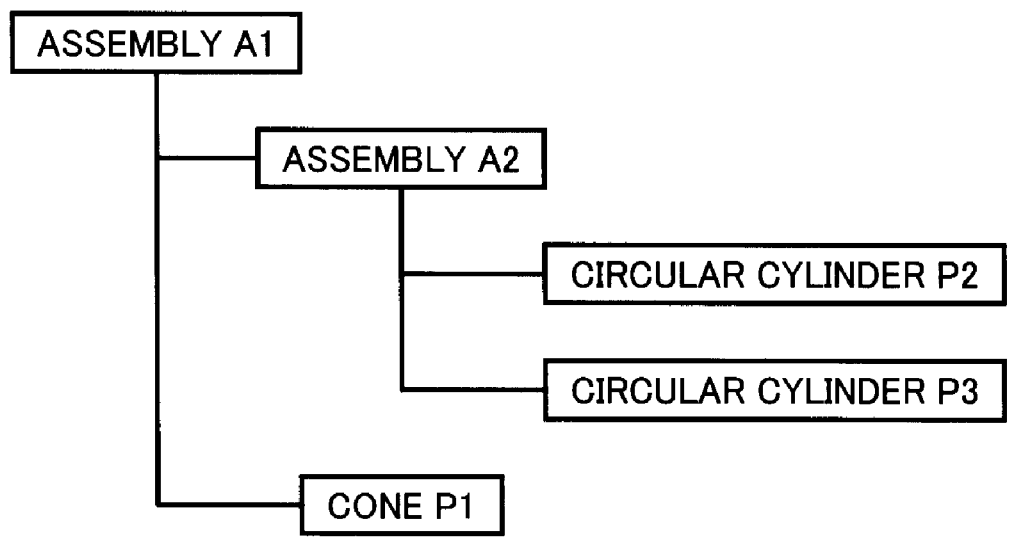
FIG. 15 is a diagram showing a hierarchical structure of data constituting the three-dimensional model shown in FIG. 13.

Finally, a flowchart for achieving the above-described processing will be explained. FIG. 10 is a flowchart for illustrating an example of processing executed when a predetermined part is specified in the embodiment shown in FIG. 6. When this flowchart is started, the following processing is executed.

[S1] The CPU 20a acquires assembly data belonging to the next higher level of a specified part.

[S2] The CPU 20a judges whether or not the acquired assembly data is one lying at the root. If it is assembly data lying at the root, the program proceeds to Step S4. If it is not, the program proceeds to Step S3.

FIG. 11 is a chart showing a data structure for assembly data. As shown in FIG. 11, the assembly data is made up of the number of models (parts or assembly data) thereunder, the model names, positions, and pointers of the models belonging to the lower levels. The model name is the name of a model belonging to the lower level, and also the position is data showing the arrangement relationship etc. between parts. Further, the pointer is data for identifying a location at which that model is stored. Although not shown in FIG. 11, the pointer of model belonging to the higher level is also provided, so that by referring to this pointer, the model at a higher level can be identified. Also, if this pointer is empty, it can be judged that that assembly data lies at the root.

[S3] The CPU 20a stores the acquired assembly data in a tree generation list (hereinafter, referred simply to as a list).

[S4] If data other than the specified part is present in the list, the program proceeds to Step S5, and if not, the processing ends.

Specifically, if assembly data is not present at the level higher than the specified part, the processing ends.

[S5] The CPU 20*a* builds a tree from the assembly data registered in the list.

When the tree is built, the high and low relationship in the hierarchy of assembly data is identified by referring to the pointer added to the assembly data), which is shown in FIG. 11, and the tree is built based on this relationship.

[S6] The CPU 20*a* supplies the built tree to the GC 20*e* to display it on the display unit 21.

As a result, the screen as shown in FIG. 8, for example, is displayed on the display unit 21.

[S7] The CPU 20*a* assigns the number of items constituting the tree to a variable i.

For example, in the example shown in FIG. 8, the number of items constituting the tree is "4".

[S8] The CPU 20*a* judges whether or not the left button of the mouse constituting the input unit 22 has been clicked. If the left button has been clicked, the program proceeds to Step S9. If not, the program proceeds to Step S10.

[S9] The CPU 20*a* displays all items constituting the tree, that is, the part data for the specified part and all assembly data.

[S10] The CPU 20*a* judges whether or not the right button of the mouse has been clicked. If the right button has been clicked, the program proceeds to Step S11, and if not, the program proceeds to Step S15.

[S11] The CPU 20*a* decreases the variable i by a value "1".

[S12] The CPU 20*a* judges whether or not the value of the variable i is "0". If it is "0", the program proceeds to Step S13, and if not, the program proceeds to Step S14.

[S13] The CPU 20*a* assigns a value obtained by adding "1" to the number of items constituting the tree to the variable i.

The reason for assigning the value obtained by adding "1" to the number of items is that when the right mouse button is clicked again, the tree having all items is displayed.

[S14] The CPU 20*a* displays the tree of i number of items on the display unit 21.

The tree of i number of items means a tree generated, for example, by selecting (i−1) number of assembly data belonging to the levels higher than the specified part.

The tree may be generated by selecting (i−1) number of assembly data from the root.

[S15] The CPU 20*a* judges whether or not the processing is continued. If the processing is continued, the program returns to Step S8, and if not, the processing ends.

The above-described processing function can be performed by using a computer. In this case, the processing content of the function that the design support system have to provide is described in a program stored in a recording medium that can be read by the computer. By executing this program by using the computer, the above-described processing is achieved by the computer. The recording media that can be read by a computer include a magnetic recording device and a semiconductor memory. When the program is distributed to the market, the program is stored on a portable recording medium such as a CD-ROM (Compact Disk Read Only Memory) or a floppy disk. Alternately, the program, which has been stored in a memory of a computer connected via a network, can be transferred to another computer through the network. When the program is executed by the computer, the program, which has been stored in a hard disk drive etc. in the computer, is loaded in the main memory.

As described above, according to the present invention, the design support system which supports work for designing a two-dimensional or three-dimensional shape by combining a plurality of parts and assembly data showing the arrangement relationship between the parts includes the shape display output means for displaying the two-dimensional or three-dimensional shape; the part specification means for specifying a predetermined part constituting the two-dimensional or three-dimensional shape displayed by the shape display output means; the assembly data acquisition means for acquiring assembly data relating to the part specified by the part specification means; and the assembly data display output means for rearranging the assembly data acquired by the assembly data acquisition means according to the hierarchical structure and displaying the rearranged assembly data.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A design support system for supporting work for designing a two-dimensional or three-dimensional shape by combining a plurality of parts and assembly data showing the arrangement relationship between the parts, comprising:

shape display output means for displaying said two-dimensional or three-dimensional shape;

part specification means for specifying a currently-displayed part constituting the two-dimensional or three-dimensional shape displayed by said shape display output means;

assembly data acquisition means for acquiring preexisting assembly data relating to the currently-displayed part specified by said part specification means; and assembly data display output means for rearranging the preexisting assembly data acquired by said assembly data acquisition means according to the hierarchical structure and displaying the rearranged assembly data, wherein said design support system further comprises level number specification means for specifying a number of levels to be displayed, and said assembly data display output means displays assembly data belonging to a level higher or lower than the currently-displayed part specified by said part specification means by the number of levels specified by said level number specification means.

2. A recording medium capable of being read by a computer, in which a program is stored, said program being used to achieve processing for supporting work for designing a two-dimensional or three-dimensional shape by combining a plurality of parts and assembly data showing the arrangement relationship between the parts by using said computer, in which said computer functions as shape display output means for displaying said two-dimensional or three-dimensional shape;

part specification means for specifying a currently-displayed part constituting the two-dimensional or three-dimensional shape displayed by said shape display output means;

assembly data acquisition means for acquiring preexisting assembly data relating to the currently-displayed part specified by said part specification means; and assembly data display output means for rearranging the preexisting assembly data acquired by said assembly data acquisition means according to the hierarchical structure and displaying the rearranged assembly data, wherein said computer further functions as level number specification means for specifying a number of levels to be displayed, and said assembly data display output means displays assembly data belonging to a level higher or lower than the currently-displayed part specified by said part specification means by the number of levels specified by said level number specification means.

3. A method for rearranging preexisting assembly data of a currently-displayed part of an object, comprising:

receiving a designation of a currently-displayed two-dimensional or three-dimensional part of an object from a user;

acquiring preexisting assembly data relating to the currently-displayed part, wherein the preexisting assembly data has a hierarchical structure;

rearranging the preexisting assembly data according to the hierarchical structure and displaying the rearranged assembly data;

specifying a number of levels to be displayed; and displaying assembly data belonging to a level higher or lower than the currently-displayed part by the number of levels.

4. The method of claim 3, further comprising:

displaying a number of levels of the hierarchical structure of the preexisting assembly data.

5. The method of claim 4, further comprising:

increasing or decreasing the number of levels displayed.

6. The method of claim 4, wherein the acquiring preexisting assembly data includes acquiring preexisting assembly data belonging to a level higher or lower than the currently-displayed part that is designated by the user.

7. The method of claim 4, further comprising:

receiving a designation of the number of levels to be displayed from the user.

8. A machine-readable medium that provides instructions, which, when executed by a machine, cause the machine to perform operations for rearranging preexisting assembly data of a currently-displayed part of an object, comprising:

receiving a designation of a currently-displayed two-dimensional or three-dimensional part of an object from a user;

acquiring preexisting assembly data relating to the currently-displayed part, wherein the preexisting assembly data has a hierarchical structure;

rearranging the preexisting assembly data according to the hierarchical structure and displaying the rearranged assembly data;

specifying a number of levels to be displayed; and displaying assembly data belonging to a level higher or lower than the currently-displayed part by the number of levels.

9. The machine-readable medium of claim 8, wherein the instructions cause the machine to perform operations further comprising:

displaying a number of levels of the hierarchical structure of the preexisting assembly data.

10. The machine-readable medium of claim 9, wherein the instructions cause the machine to perform operations further comprising:

increasing or decreasing the number of levels displayed.

11. The machine-readable medium of claim 9, wherein the acquiring preexisting assembly data includes acquiring preexisting assembly data belonging to a level higher or lower than the currently-displayed part that is designated by the user.

12. The machine-readable medium of claim 9, wherein the instructions cause the machine to perform operations further comprising:

receiving a designation of the number of levels to be displayed from the user.

13. A design support system for supporting work for designing a two-dimensional or three-dimensional shape by combining a plurality of parts and assembly data showing the arrangement relationship between the parts, comprising:

a shape display output unit displaying said two-dimensional or three-dimensional shape;

a part specification unit specifying a currently-displayed part constituting the two-dimensional or three-dimensional shape displayed by said shape display output unit;

an assembly data acquisition unit acquiring preexisting assembly data relating to the currently-displayed part specified by said part specification unit; and an assembly data display output unit rearranging the preexisting assembly data acquired by said assembly data acquisition unit according to the hierarchical structure and displaying the rearranged assembly data, wherein said design support system further comprises a level number specification unit for specifying a number of levels to be displayed, and said assembly data display output unit displays assembly data belonging to a level higher or lower than the currently-displayed part specified by said part specification unit by the number of levels specified by said level number specification unit.

14. The design support system according to claim 13, wherein said assembly data acquisition unit acquires preexisting assembly data belonging to the level higher or lower than the part specified by said part specification unit.

15. The design support system according to claim 13, wherein said design support system further comprises a level number specification unit specifying the number of levels to be displayed, and said assembly data display output unit displays assembly data belonging to the level higher or lower than the currently-displayed part specified by said part specification unit by the number of levels specified by said level number specification unit.

* * * * *